No. 825,789. PATENTED JULY 10, 1906.
H. B. WOOD.
EYEGLASS ATTACHMENT.
APPLICATION FILED NOV. 15, 1905.

UNITED STATES PATENT OFFICE.

HORACE B. WOOD, OF NEW HAVEN, CONNECTICUT.

EYEGLASS ATTACHMENT.

No. 825,789.  Specification of Letters Patent.  Patented July 10, 1906.

Application filed November 15, 1905. Serial No. 287,506.

*To all whom it may concern:*

Be it known that I, HORACE B. WOOD, a citizen of the United States, residing at New Haven, in the county of New Haven and State of Connecticut, have invented certain new and useful Improvements in Eyeglass Attachments; and I do hereby declare the following to be a full, clear, and exact description of the invention, such as will enable others skilled in the art to which it appertains to make and use the same.

This invention relates to improvements in eyeglass attachments, and is especially designed to provide the nose-piece with a cushion member adapted to flexibly but firmly engage the nose of the wearer, whereby the eyeglasses are securely but comfortably held thereon.

To this end the invention consists in providing the nose-pieces with a casing of elastic material, said casing having a central aperture through which the nose-piece is inserted into the casing and the casing stretched thereover.

To more fully describe the invention, reference is had to the accompanying drawings, illustrating a practical application of the same, in which like numerals designate the same parts in the several views, and in which—

Figure 1:
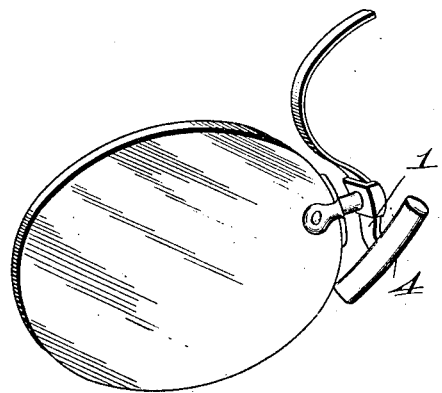
Figure 2:
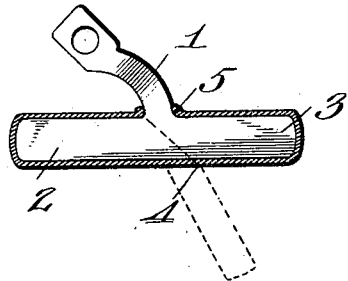
Figure 3:
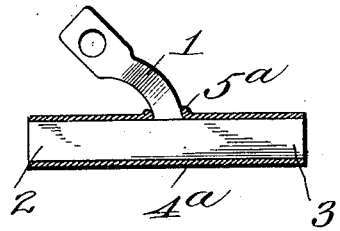

Figure 1 is a perspective view of a portion of an eyeglass with my improvement applied thereto. Fig. 2 is a central longitudinal section through the elastic casing, a nose-piece being shown fitted therein, the position of the free end of the casing before finally stretching the same over the nose-piece being shown in dotted lines. Fig. 3 is a longitudinal section through a modified form of casing and showing the same applied to a nose-piece.

In illustrating the invention there is shown a nose-piece as commonly constructed, comprising the arm 1, adapted to be secured to the eyeglass-frame, said arm terminating in the elongated contact-piece having the oppositely-disposed ends 2 and 3.

4 is a casing of flexible material, preferably molded rubber, formed in sizes to normally fit over the contact member of the nose-piece. As shown in Figs. 1 and 2, this casing 4 is closed at its ends and is provided centrally with an aperture 5, which aperture or opening being formed by molding will prevent the rubber from tearing or ripping as the covering or casing is being stretched into position on the nose-piece.

In Fig. 3 is shown a slight modification wherein the casing $4^a$ is formed from a tube of rubber, the ends of which are left open. This form is similarly provided with an aperture $5^a$.

The operation of fitting the rubber casing over the nose-piece is apparent from Fig. 2, but might be briefly described as follows: For instance, the end 2 of the contact member is inserted into the opening 5 and forced down into the casing until the arm 1 is reached. The other or free end of the casing will now be in the position shown in dotted lines, and it is then stretched until the opposite end 3 of the contact member may be inserted within the aperture and the casing allowed to assume its normal shape. It will be understood that in the formation of these casings the same are preferably molded in flattened tubular form in cross-section, so as to more perfectly fit the common rectangular form of contact member of the nose-piece; but it is obvious that this particular formation is not essential.

I am aware that nose-pieces have heretofore been provided with pads or coverings of flexible material. Such nose-pieces, however, are constructed to have a free projecting end over which the casing is forced along the contact-piece, and sometimes this projecting end is then secured, while at other times it is not secured. In such constructions, however, it is not possible to fit said coverings over a nose-piece, as illustrated in the drawings, (a most common construction,) wherein the contact-pieces extend on both sides of the arm, securing the same to the frame. I therefore make no claim to the broad idea of applying a rubber member to the nose-piece of eyeglasses; but What I do claim is—

1. As an article of manufacture, a covering for the contact member of the nose-piece of eyeglasses, comprising a tubular member of rubber provided with a peripheral molded opening, substantially as described.

2. As an article of manufacture, a covering for the contact member of the nose-piece of eyeglasses, comprising a tubular member of rubber having its ends closed and provided peripherally with a protected elastic opening, substantially as described.

In testimony whereof I affix my signature in presence of two witnesses.

HORACE B. WOOD.

Witnesses:
MARY G. REYNOLDS,
BERNARD E. LYNCH.